Feb. 13, 1968   M. KRØGER   3,368,281
MEASURING DEVICE FOR LENGTH MEASURING OF FOOTWEAR
Filed March 25, 1966
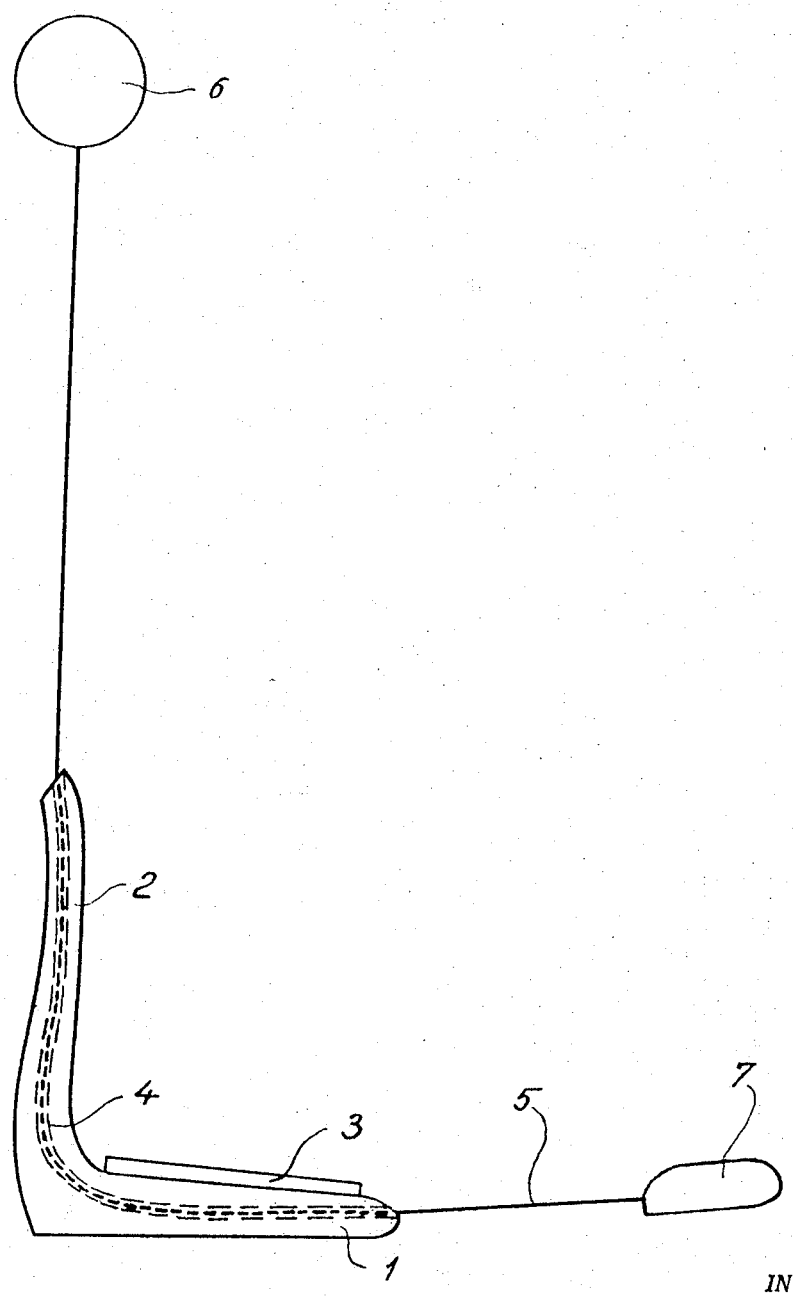
INVENTOR.
Mogens Krøger
BY
ATTORNEY

United States Patent Office 3,368,281
Patented Feb. 13, 1968

3,368,281
MEASURING DEVICE FOR LENGTH MEASURING
OF FOOTWEAR
Mogens Krøger, Rodovrevej 288, Vanlose,
Copenhagen, Denmark
Filed Mar. 25, 1966, Ser. No. 537,361
Claims priority, application Denmark, Apr. 5, 1965,
1,723/65
1 Claim. (Cl. 33—3)

ABSTRACT OF THE DISCLOSURE

A measuring device for length measuring of footwear consisting of an angular shaped block having a horizontal first leg and a second leg and having a tunnel, a scale slidable by pushing or pulling, a reference point against which the scale is read, the horizontal leg having at its underside a supporting face for supporting the device, and at its upper side a foot support, the second leg corresponding in thickness to the toe room required in a shoe.

The prior art

By the known devices of this kind, the upper side of the horizontal leg of the block has a considerable slope, or has a great vertical distance from the horizontal portion of the scale, so that it is impossible to measure directly the length of a foot by means of these devices. The length of the foot must therefore be measured separately, or the device must have further means for measuring the foot length.

Summary of the invention

It is the object of the invention to create a measuring device of the kind described which is well suited for measuring both the foot length and the shoe length.

This is according to the invention obtained by the fact that the horizontal leg of the block has at its underside a supporting face for supporting the device on a plane foundation, and at its upper side a surface serving as a foot support, while the second leg of the block is shaped to serve as an abutment partly for a heel and partly for the quarter of a footwear, said second leg having a thickness corresponding to the desired length play between foot and footwear.

When the foot is resting on the upper side of the horizontal leg of the block, the device will be prevented from movement during the adjustment of the scale. Moreover, the foot will be positioned correctly in relation to the block by the abutting of the heel against the second leg of the block. Preferably, the graduation on the scale indicates the shoe numbers directly, corresponding to the length of the foot, whereby the thickness of the second vertical leg of the block becomes equal to the length play between the foot and the footwear. This length play should be maximum in the case of children's footwear, as children's feet are growing. The length play in footwear for adults should be a little less, and a device to be used for adults should therefore have a thinner vertical leg of the angular block.

The device can also be used to decide the internal length of footwear in a direct way, whereby the vertical leg of the block should abut against the quarter while the horizontal leg is resting on the upper side of the sole. Hereby, the scale will stand up vertically from the sole, so that it is also possible to measure high boots and the like by means of the device, which will then directly indicate the footwear number.

Description of the drawing

In the drawing is shown a measuring device according to the invention in a lateral view.

The device has a preferably cast metal block of angular shape, having two legs 1 and 2. The horizontal leg 1 has at its underside a plane supporting face able to rest against a plane foundation, and at the upper side a riflet rubber plate 3 glued thereto and serving as a rest for a foot. The second leg 2 of the block is substantially perpendicular to the leg 1 and is projecting upwardly in a vertical direction.

The block 1, 2 has a throughgoing tunnel 4 receiving a steel scale 5 having at the upper end a spherically shaped handle 6, and at the lower end a well rounded abutment member 7 adapted to strike against the inner side of a shoe cap. The upper edges of the leg 2 can serve as a reference point against which to read the scale.

The curvature of the tunnel 4 provides for a suitable friction against the sliding movement of the steel scale 5, so that this will be held in any adjusted position. The scale 5 has at its upper side a graduation partly in length units, such as centimeters or inches, and partly in shoe numbers. These graduations are read at the upper end of the leg 1.

When a foot is to be measured, the foot is placed on the rubber plate 3 with the heel abutting against the leg 2. Thereafter, the handle 6 is slid up or down, until the abutment member 7 is aligned with the tip of the toe.

When footwear is to be measured, the block 1, 2 is accommodated in the footwear with the leg 2 abutting against the inner side of the quarter. Thereafter, the handle 6 is moved until the abutment member 7 strikes the inner side of the shoe cap. Hereafter, the device may be removed from the footwear, and the scale can be read.

The device may be made of other materials than indicated. For instance, both the block 1, 2 and the scale 5 may be made of plastic.

I claim:
1. A measuring device for length measuring of footwear consisting of an angular shaped block having a horizontal first leg and a second leg and having a throughgoing tunnel in which a flexible, but still suitably rigid scale is slidable by pushing or pulling at one end of the scale, the device including a reference point against which the scale is read, the tunnel being dimensioned to provide a suitable friction against the sliding movement of the scale, said horizontal leg of the block having at its underside a supporting face for supporting the device on a plane foundation, and at its upper side a surface serving as a foot support, said second leg of the block shaped to serve as an abutment for a heel or its underside and for the quarter of a footwear, on its outer side said second leg having a thickness corresponding to the desired length play between foot and footwear.

References Cited

UNITED STATES PATENTS

| 2,672,688 | 3/1954 | Crandall et al. | 33—3.2 |
| 2,793,439 | 5/1957 | Simpson | 33—3.4 |
| 3,148,450 | 9/1964 | Del Pesco | 33—3.4 |

FOREIGN PATENTS

| 81,636 | 1894 | Germany. |
| 651,581 | 1936 | Germany. |

LEONARD FORMAN, Primary Examiner.
LLOYD V. ANDERSON, Assistant Examiner.